(12) United States Patent
Zhao et al.

(10) Patent No.: US 11,263,727 B2
(45) Date of Patent: Mar. 1, 2022

(54) IMAGE ENHANCEMENT METHOD, DATA PROCESSING DEVICE, AND STORAGE MEDIUM

(71) Applicant: TENCENT TECHNOLOGY (SHENZHEN) COMPANY LIMITED, Guangdong (CN)

(72) Inventors: Yong Fei Zhao, Shenzhen (CN); Zhi Jiao Guo, Shenzhen (CN); Liang Wang, Shenzhen (CN); Hai Chang Zhai, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 38 days.

(21) Appl. No.: 16/902,481

(22) Filed: Jun. 16, 2020

(65) Prior Publication Data
US 2020/0311880 A1     Oct. 1, 2020

Related U.S. Application Data

(63) Continuation of application No. PCT/CN2019/074067, filed on Jan. 31, 2019.

(30) Foreign Application Priority Data

Feb. 13, 2018  (CN) .......................... 201810149722.1

(51) Int. Cl.
*G06T 5/00*     (2006.01)
*G06T 5/50*     (2006.01)

(52) U.S. Cl.
CPC .............. *G06T 5/002* (2013.01); *G06T 5/009* (2013.01); *G06T 5/50* (2013.01);
(Continued)

(58) Field of Classification Search
CPC ........... G06T 5/002; G06T 5/009; G06T 5/50; G06T 5/003; G06T 5/00; G06T 5/008;
(Continued)

(56) References Cited

U.S. PATENT DOCUMENTS

2014/0177960 A1* 6/2014 Park .................. G06T 5/003
                                                                  382/167
2014/0285719 A1* 9/2014 Gong .................... H04N 5/208
                                                                  348/606

(Continued)

FOREIGN PATENT DOCUMENTS

CN   103337061 A   10/2013
CN   104318527 A    1/2015
(Continued)

OTHER PUBLICATIONS

Chinese Office Action for 201810149722.1 dated Jul. 29, 2019.
(Continued)

*Primary Examiner* — Jose L Couso
(74) *Attorney, Agent, or Firm* — Sughrue Mion, PLLC

(57) ABSTRACT

Provided is an image enhancement method, performed by a data processing device, the method including: performing a first edge-preserving filtering on an original image to obtain a first processed image; obtaining a detail feature of the original image based on the original image and the first processed image; determining a second processed image according to the detail feature and the first processed image; and processing the second processed image in a guided image filtering manner by using the original image as a first guidance image, to obtain a third processed image, and outputting the third processed image to be displayed.

20 Claims, 12 Drawing Sheets

(52) U.S. Cl.
CPC ............... *G06T 2207/20076* (2013.01); *G06T 2207/20192* (2013.01); *G06T 2207/20224* (2013.01)

(58) Field of Classification Search
CPC .. G06T 5/10; G06T 5/20; G06T 5/001; G06T 5/004; G06T 2207/20076; G06T 2207/20192; G06T 2207/20224; G06T 2207/10024; G06T 2207/10016; G06T 2207/20012; G06T 2207/20028; G06T 2207/20016; G06T 7/13; G06T 7/11; G06T 7/40; G06T 5/007; G06T 2207/90; G06T 2207/12; G06T 2207/246; H04N 1/4092; H04N 1/58; H04N 1/6027; H04N 1/6072; H04N 1/62; H04N 5/23229; H04N 5/142; H04N 9/646; H04N 9/64; H04N 19/117; H04N 19/186; H04N 19/136; G06K 9/00228; G06K 9/4609; G06K 9/6202; G06K 9/4652; G06K 9/00281; G06K 9/40
See application file for complete search history.

(56) References Cited

U.S. PATENT DOCUMENTS

| | | | | |
|---|---|---|---|---|
| 2015/0139566 | A1* | 5/2015 | Nakamura | G06T 5/50 382/264 |
| 2016/0021391 | A1* | 1/2016 | Su | H04N 19/30 375/240.12 |
| 2016/0048952 | A1* | 2/2016 | Tezaur | G06T 5/004 382/255 |
| 2016/0241884 | A1* | 8/2016 | Messing | H04N 19/53 |
| 2016/0275675 | A1* | 9/2016 | Nakajima | G06T 5/20 |
| 2016/0292824 | A1* | 10/2016 | Li | G06T 5/002 |
| 2017/0109867 | A1* | 4/2017 | Milshteyn | G06T 5/50 |
| 2017/0206690 | A1* | 7/2017 | Itoh | G06T 7/90 |
| 2017/0278224 | A1* | 9/2017 | Onzon | G06T 5/002 |
| 2018/0053289 | A1* | 2/2018 | Garcia Becerro | G06T 5/009 |
| 2018/0204307 | A1* | 7/2018 | Schied | G06T 5/20 |

FOREIGN PATENT DOCUMENTS

| | | |
|---|---|---|
| CN | 108335275 A | 7/2018 |
| KR | 10-2013-0123026 A | 11/2013 |

OTHER PUBLICATIONS

Chinese Office Action for 2018101497221 dated May 8, 2019.
International Search Report for PCT/CN2019/074067 dated Apr. 17, 2019 (PCT/ISA/210).
Zheng Xianhui et al., "Single-Image-Based Rain and Snow Removal Using Multi-guided Filter", Nov. 3, 2013 (Nov. 3, 2013), Big Data Analytics in the Social and Ubiquitous Context : 5th International Workshop on Modeling Social Media, MSM 2014, 5th International Workshop on Mining Ubiquitous and Social Environments, Muse 2014 and First International Workshop on Machine LE, pp. 258-265, XP047044314 (8 pages total).
He K et al., "Guided Image Filtering", IEEE Transactions on Pattern Analysis and Machine Intelligence, Machine Intelligence, vol. 35, No. 6, Jun. 2013, pp. 1397-1409, XP002741295 (13 pages total).
Written Opinion dated Apr. 17, 2019 from the International Searching Authority in International Application No. PCT/CN2019/074067.
Extended European Search Report dated Feb. 23, 2021 from the European Patent Office in EP Application No. 19754702.9.
Communication dated Mar. 15, 2021 from the European Patent Office in EP Application No. 19754702.9.

* cited by examiner

IMAGE ENHANCEMENT METHOD, DATA PROCESSING DEVICE, AND STORAGE MEDIUM

CROSS-REFERENCE TO RELATED APPLICATION(S)

This application is a bypass continuation application of International Application No. PCT/CN2019/074067, filed on Jan. 31, 2019, which claims the priority to Chinese patent application No. 201810149722.1, filed with the China National Intellectual Property Administration on Feb. 13, 2018 and entitled "IMAGE ENHANCEMENT METHOD AND APPARATUS, COMPUTING DEVICE, AND STORAGE MEDIUM", the disclosures of which are incorporated herein by reference in their entireties.

FIELD

Example embodiments of the disclosure relate to the field of image processing technologies, and in particular, to an image enhancement method, a data processing device, and a storage medium.

BACKGROUND

With the development of multimedia technologies, there is a great demand for videos in various fields. In order to provide a high-quality video, image enhancement may be performed on an image frame sequence in a video in some application scenarios. For example, some image processing applications may use smooth filtering or the like for image enhancement. However, the related art technologies for image enhancement need to improve an image enhancement effect.

SUMMARY

One or more example embodiments provide methods and apparatuses for performing image enhancement to improve an image enhancement effect.

According to an aspect of an example embodiment, there is provided an image enhancement method, performed by a data processing device. In the method, a first edge-preserving filtering may be performed on an original image to obtain a first processed image. A detail feature of the original image may be obtained based on the original image and the first processed image. A second processed image may be generated according to the detail feature and the first processed image. The second processed image is processed in a guided image filtering manner by using the original image as a first guidance image, to obtain a third processed image, and the third processed image may be output to be displayed.

According to an aspect of an example embodiment, there is provided an image enhancement apparatus, including: at least one memory configured to store program code; and at least one processor configured to read the program code and operate as instructed by the program code, the program code including: first smoothing code configured to cause at least one of the at least one processor to perform an edge-preserving filtering on an original image to obtain a first processed image; detail obtaining code configured to cause at least one of the at least one processor to obtain a detail feature of the original image based on the original image and the first processed image; image superimposing code configured to cause at least one of the at least one processor to generate a second processed image according to the detail feature and the first processed image; and image enhancement code configured to cause at least one of the at least one processor to process the second processed image in a guided image filtering manner by using the original image as a first guidance image, to obtain a third processed image, and output the third processed image to be displayed.

According to an aspect of an example embodiment, there is provided a video service system, including the above image enhancement apparatus.

According to an aspect of an example embodiment, there is provided a terminal device, including the above image enhancement apparatus.

According to an aspect of an example embodiment, there is provided a data processing device, including: one or more processors; a memory; and one or more programs stored in the memory and configured to be executed by the one or more processors, to cause the one or more processors to perform the above image enhancement method.

According to an aspect of an example embodiment, there is provided a non-transitory storage medium storing one or more programs, executable by one or more processors of a data processing device, to cause the one or more processors of the data processing device to perform an image enhancement method, the method including: performing an edge-preserving filtering on an original image to obtain a first processed image; obtaining a detail feature of the original image based on the original image and the first processed image; generating a second processed image according to the detail feature and the first processed image; and processing the second processed image in a guided image filtering manner by using the original image as a first guidance image, to obtain a third processed image, and outputting the third processed image to be displayed

BRIEF DESCRIPTION OF THE DRAWINGS

To describe the technical solutions in example embodiments more clearly, the following briefly describes the accompanying drawings required for describing the example embodiments. Apparently, the accompanying drawings in the following description show merely some example embodiments, and a person of ordinary skill in the art may derive other drawings from these accompanying drawings without creative efforts.

DETAILED DESCRIPTION

The technical solutions in the example embodiments will be clearly and completely described in the following with reference to the accompanying drawings in the example embodiments. It is obvious that the embodiments to be described are only some rather than all of the example embodiments. All other embodiments obtained by a person of ordinary skill in the art based on the example embodiments without creative efforts shall fall within the protection scope of this application.

Figure 1A:
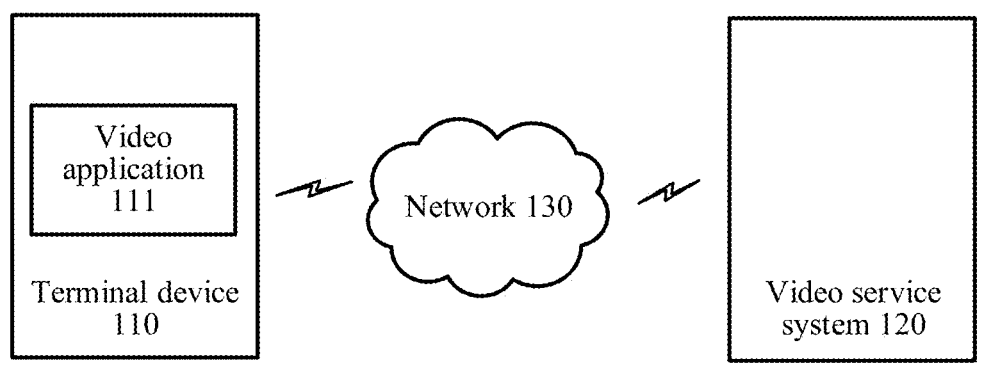
FIG. 1A is a schematic diagram of an application scenario according to some example embodiments.

FIG. 1A is a schematic diagram of an application scenario according to some example embodiments. As shown in FIG. 1A, the application scenario includes a terminal device 110 and a video service system 120. Herein, the terminal device 110 may be, for example, various devices such as a desktop computer, a mobile phone, a tablet computer, a smart television (TV), or a laptop computer. The terminal device 110 may include a video application 111. For example, the terminal device 110 may download and install the video application 111. The video application 111 may be alternatively pre-installed in the terminal device 110. The video service system 120 may include, for example, one or more servers. In some example embodiments, the video service system 120 may store video content. The video application 111 may obtain the video content from the video service system 120 through a network 130. The video application 111 may perform video enhancement on the video content from the local or from the video service system 120. The video application 111 may be, for example, various applications that include a video play function such as a video play client (for example, a Tencent video client or an iQiyi video client), a social application, or a browser. These are merely examples and the disclosure is not limited thereto.

Figure 1B:
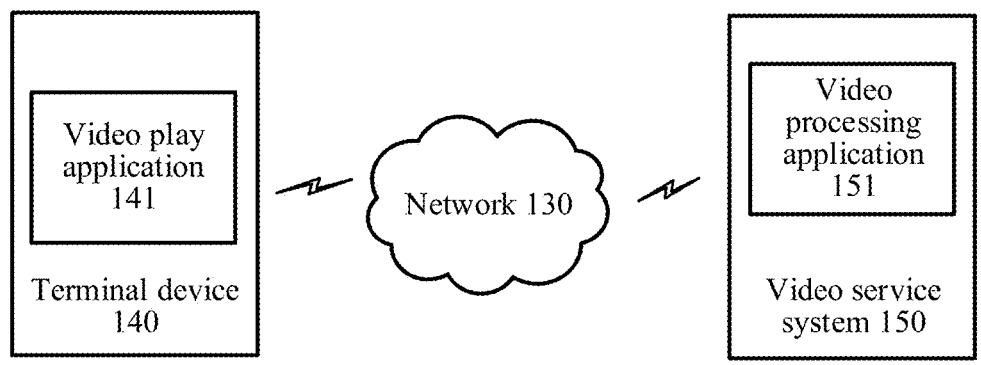
FIG. 1B is a schematic diagram of an application scenario according to some example embodiments.

FIG. 1B is a schematic diagram of an application scenario according to some example embodiments. As shown in FIG. 1B, the application scenario includes a terminal device 140 and a video service system 150. The video service system 150 may include a video processing application 151. The video processing application 151 may perform image enhancement on a video. The terminal device 140 may include a video play application 141. The video play application 141 is, for example, various applications including a video play function such as a video play client, a social application, or a browser. The video play application 141 may obtain and play back an image-enhanced video from the video service system 150.

In view of the above, both the terminal device 110 and the video service system 150 may be used to enhance a video. In addition, various devices for video enhancement may perform image enhancement on each image frame in a video. An image enhancement method according to example embodiments is described in detail below with reference to FIG. 2.

Figure 2A:
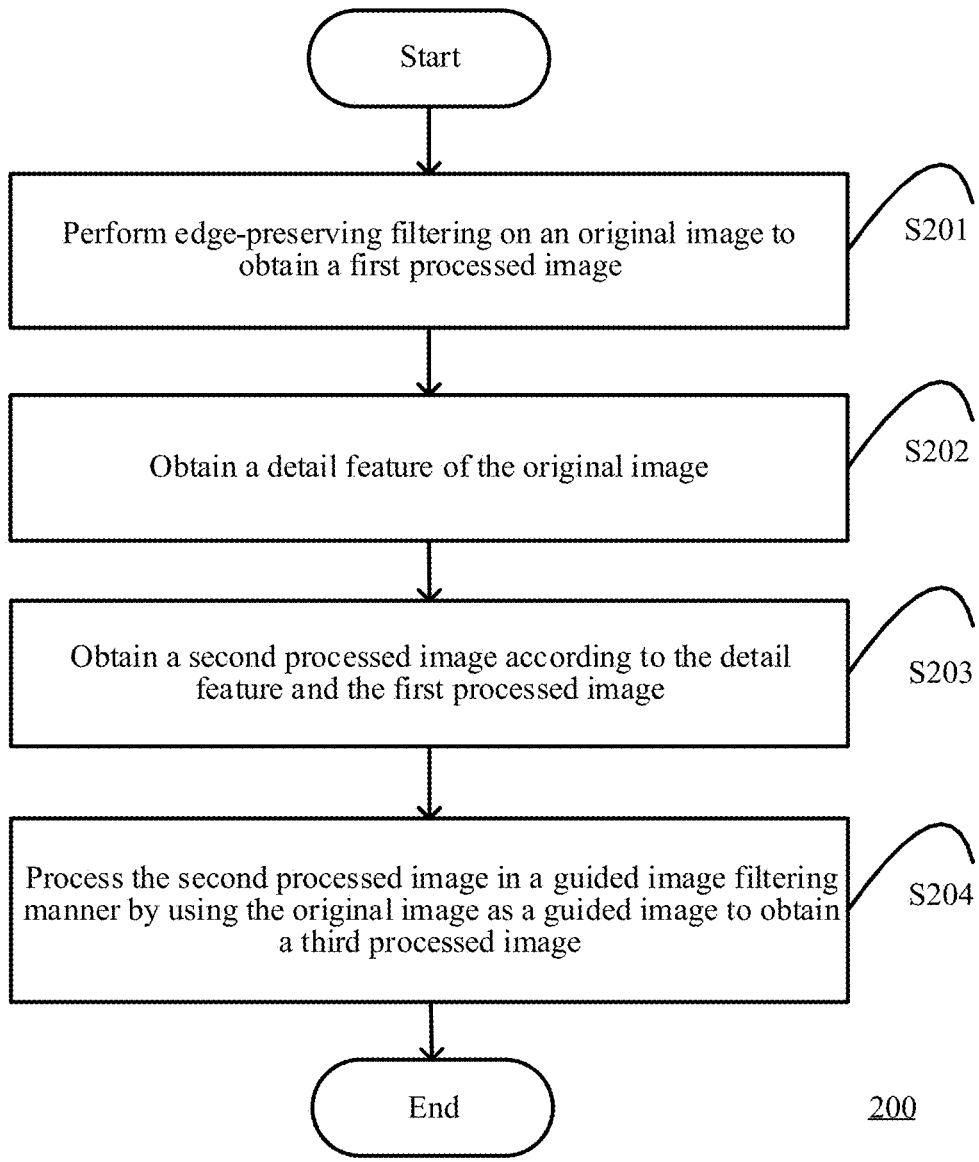
FIG. 2A is a flowchart of an image enhancement method 200 according to some example embodiments.
Figure 2B:
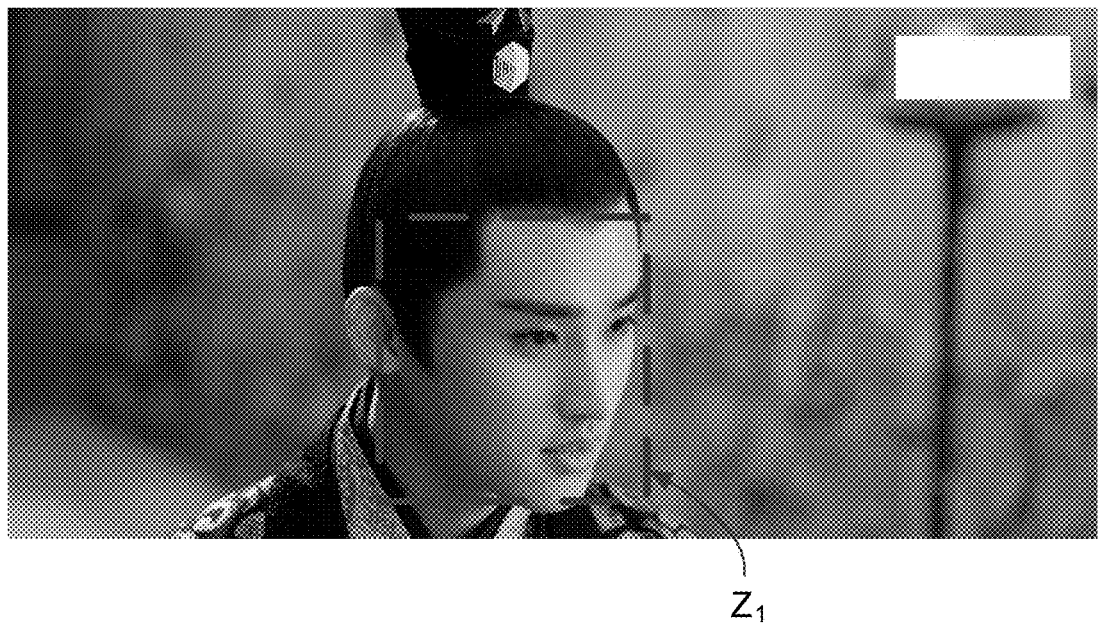
FIG. 2B and FIG. 2C respectively show an original image and a first processed image according to some example embodiments.
Figure 2C:

FIG. 2A is a flowchart of an image enhancement method 200 according to some example embodiments. The image enhancement method 200 may be performed by, for example, a data processing device such as a terminal device 110 or a video service system 150. As shown in FIG. 2A, the image enhancement method 200 may include operation S201: edge-preserving filtering is performed on an original image to obtain a first processed image. In an example embodiment, in operation S201, the original image is processed in a guided image filtering manner by using the original image as a guidance image to obtain the first processed image. In some example embodiments, in operation S201, various edge-preserving filtering manners such as median filtering, bilateral filtering, or weighted least square filtering may be used. Through edge-preserving filtering, denoising processing may be performed on the original image in operation S201. For example, FIG. 2B and FIG. 2C respectively show the original image and the first processed image in some example embodiments. As shown in FIG. 2B and FIG. 2C, the first processed image has a higher smoothness degree than the original image.

In operation S202, a detail feature of the original image is obtained. Herein, the detail feature may include, for example, an edge feature and a texture feature. In some example embodiments, in operation S202, a color difference between the original image and the first processed image may be first determined, and then the detail feature is determined according to the color difference. In some example embodiments, in operation S202, a difference between the original image and the first processed image on one or more color channels may be determined, and the difference on the one or more color channels is used as the color difference.

In some example embodiments, when the original image is a grayscale image, in operation S202, a grayscale value difference between the original image and the first processed image may be determined, and the grayscale value is used as the color difference.

In some example embodiments, the original image may include a plurality of color channels. In operation S202, a difference between the original image and the first processed image on the plurality of color channels may be determined, and the difference is used as the color difference. For example, the original image is in a red, green and blue (RGB) format. Correspondingly, the color difference obtained in operation S202 may include a difference of a red channel, a difference of a green channel, and a difference of a blue channel. Herein, the color difference determined in operation S202 may include, for example, feature information such as an edge and a texture in the original image.

After the color difference is determined, the detail feature of the original image may be determined according to the color difference in operation S202. For example, the color difference may be directly used as the detail feature in operation S202. For another example, in operation S202, the color difference may be enhanced according to an adjustment coefficient to obtain an enhanced color difference, and the enhanced color difference is used as the detail feature corresponding to the original image. Herein, if a value of the adjustment coefficient is larger, a degree of enhancement is higher. In addition, the detail feature of the original image may be obtained in other various manners in operation S202.

Figure 2D:
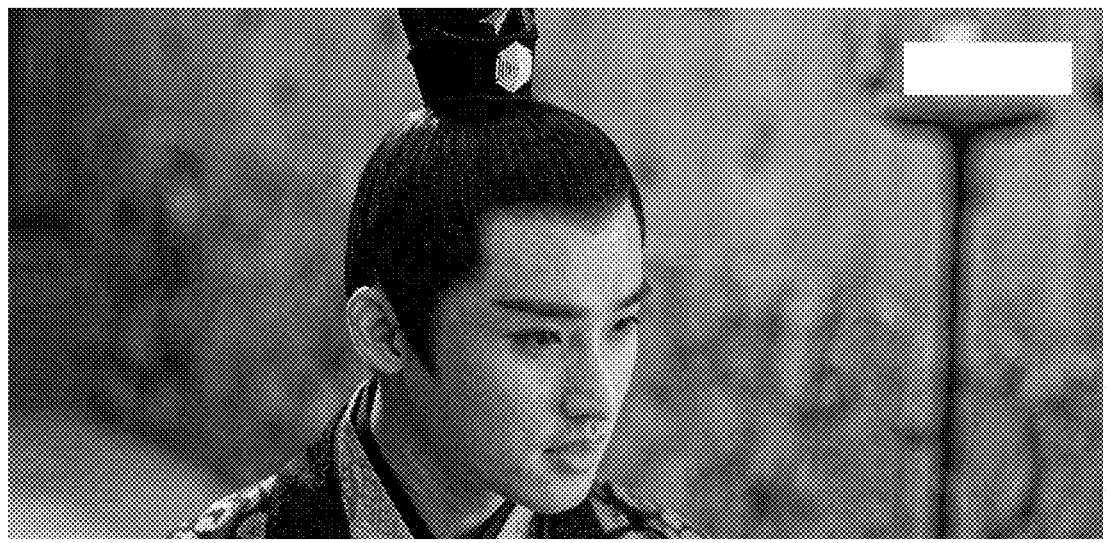
FIG. 2D shows a second processed image according to some example embodiments.

After the detail feature is determined in operation S202, operation S203 may be performed in the image enhancement method 200. In operation S203, a second processed image is determined according to the detail feature and the first processed image. For example, in operation S203, the detail feature may be superimposed on the first processed image to obtain the second processed image. In addition, the second processed image may be determined by using the detail feature and the first processed image in other manners in operation S203. Herein, the second processed image is determined by using the detail feature and the first processed image in operation S203, so that the second processed image may maintain a smoothness degree (or a noise reduction degree) close to the first processed image, and the second processed image may have an enhanced detail feature. In other words, details of the second processed image are easier to distinguish than in the first processed image. For example, FIG. 2D shows the second processed image obtained through processing in operation S202 on the first processed image in FIG. 2C. In comparison with FIG. 2C, details of the second processed image in FIG. 2D are easier to distinguish.

Figure 2E:
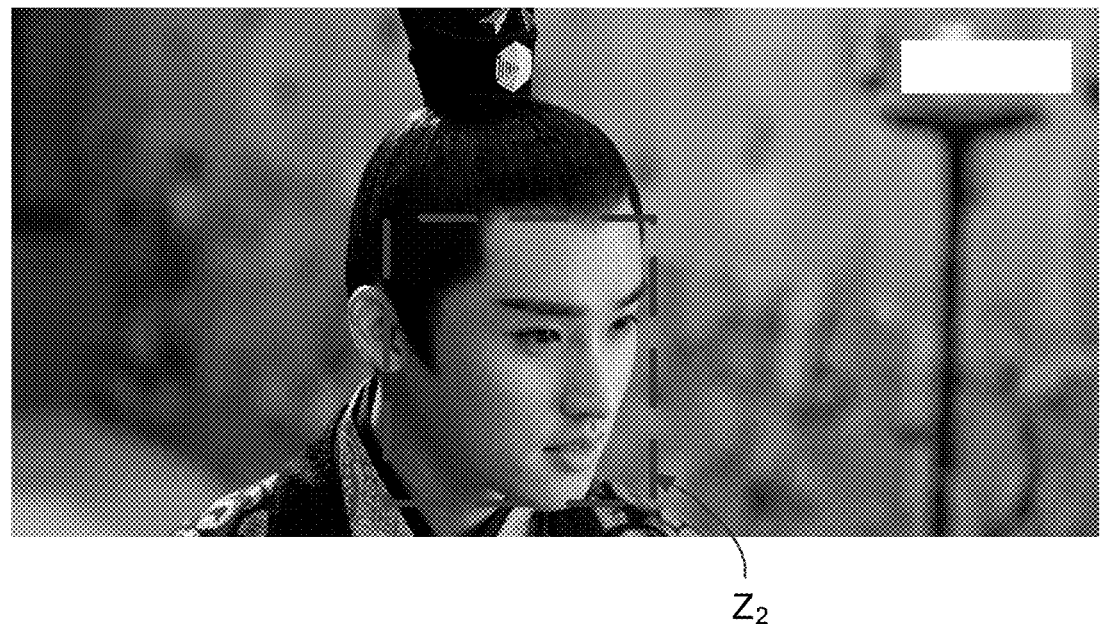
FIG. 2E shows a third processed image according to some example embodiments.
Figure 2F:
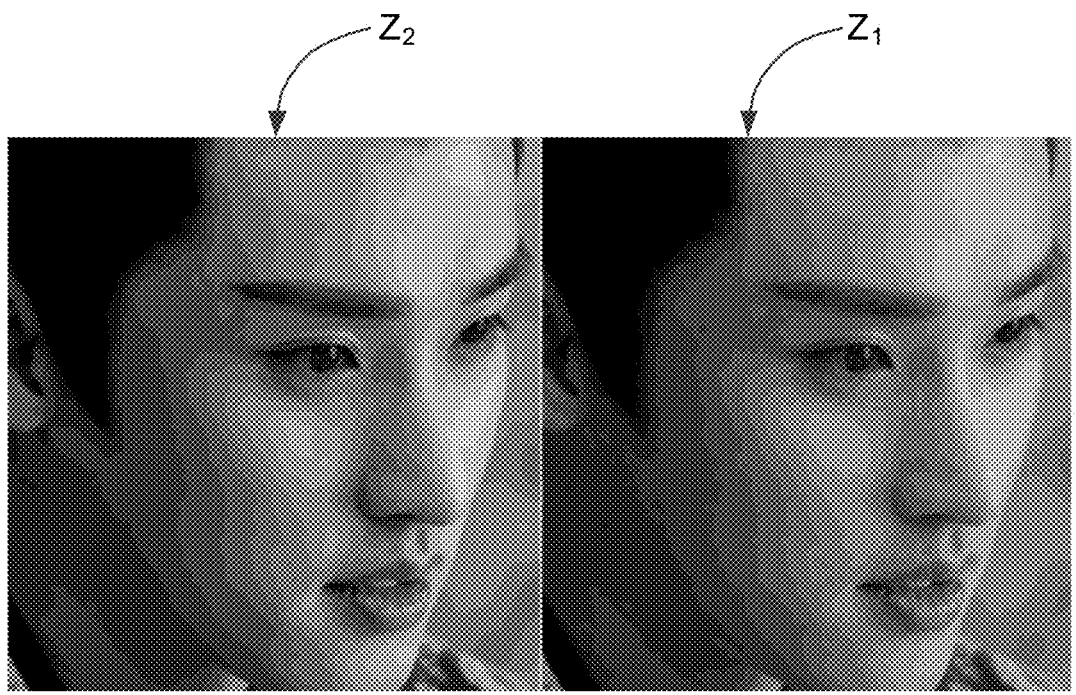
FIG. 2F is a diagram of comparison between a zone Z2 in FIG. 2E and Z1 in FIG. 2B.

In operation S204, the second processed image is processed in the guided image filtering manner by using the original image as a guidance image to obtain a third processed image. In this way, noise reduction may be performed on the second processed image in operation S204, to improve a noise reduction degree of the third processed image. In addition, the original image is used as a guidance image, and when smoothing processing is performed on the second processed image in operation S204, a detail feature of the second processed image may be retained according to the detail feature of the original image. In other words, image enhancement is performed on the second processed image by using the original image as a guidance image in operation S204, so that a detail feature of the third processed image may be more consistent with an overall overview of the original image. In short, the detail feature of the third processed image may be more close to the overall overview of the original image in operation S204, that is, details are more integrated with an overall image of the original image. For example, FIG. 2E shows the third processed image corresponding to the second processed image in FIG. 2D. FIG. 2F is a diagram of comparison between a zone Z2 in FIG. 2E and Z1 in FIG. 2B. Content of the zone Z1 is the same as content of the zone Z2. Compared with Z1 representing the original image, Z2 representing the third processed image has a clearer picture, more uniform overall brightness, a stronger sense of layering, and a higher contrast. FIG. 2D and FIG. 2F are displayed as grayscale images, which may be actually color images. The colored third processed image may be more vivid in operation S204.

In view of the above, according to the image enhancement method 200, the third processed image with a high smoothness degree and an enhanced detail feature may be obtained and output as a final processed image to be displayed to a user. Herein, in the image enhancement method 200, a noise reduction degree of an image is improved and a detail feature is enhanced, so that a picture becomes clearer, overall brightness is more uniform, a sense of layering is stronger, a contrast is higher, and colors are more vivid. If a contrast is higher, a color level of an image is higher, and a picture is fuller. In particular, in the image enhancement method 200, adaptive processing of image content may be achieved based on a combination of the foregoing operations, thereby improving robustness of image processing. In addition, in the image enhancement method 200, brightness of the third processed image may be more uniform in the guided image filtering manner.

Figure 3:
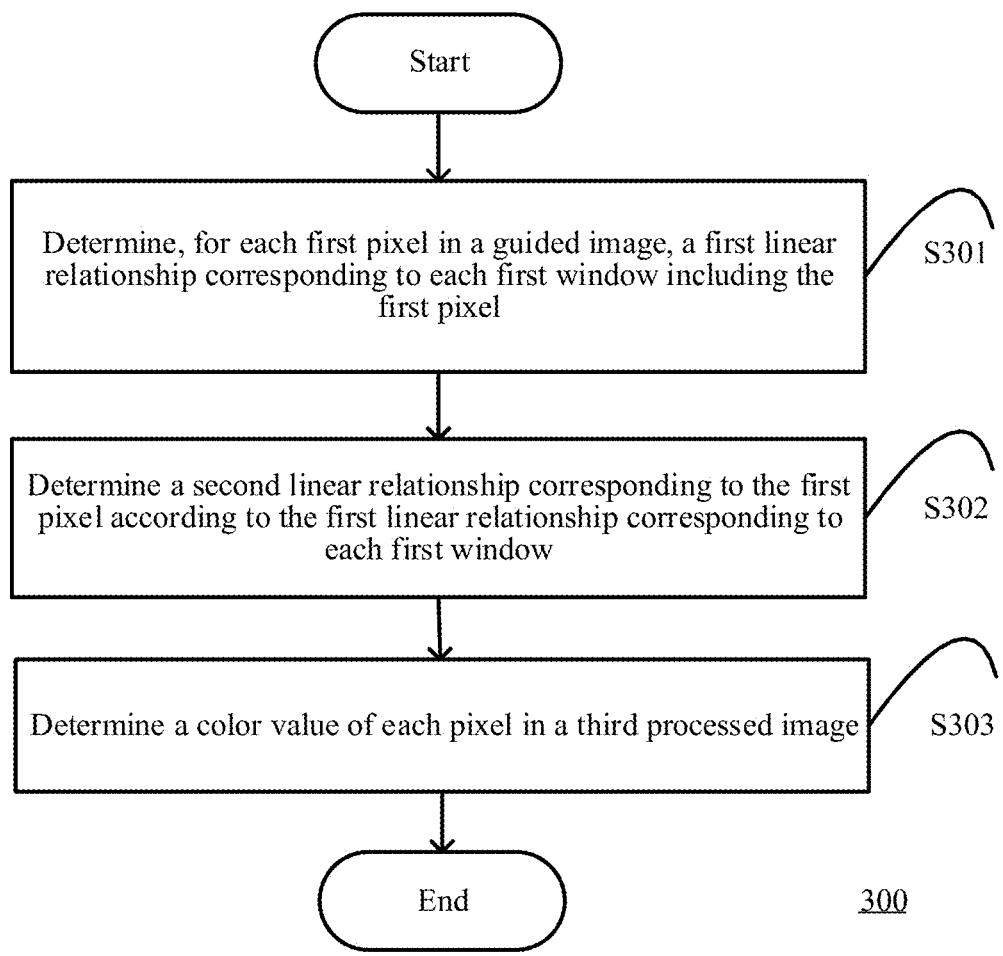
FIG. 3 is a flowchart of a method for obtaining a third processed image according to some example embodiments.

In addition, the guided image filtering manner in operation S201 and operation S204 may be: performing filtering processing on each color channel (for example, RGB). A result of the filtering processing is a result of superimposing a processing result of each color channel. In this way, color cast of an image after detail enhancement may be avoided in the image enhancement method 200. The processing process of operation S204 is used as an example to further describe guided image filtering below. FIG. 3 is a flowchart of a method 300 for obtaining a third processed image according to some example embodiments.

First, for convenience of description and in order to better distinguish a pixel in the guided image (e.g., the original image), a pixel in the second processed image, and a pixel in the third processed image, the pixel in the guided image is referred to as a first pixel, the pixel in the second processed image is referred to as a second pixel, and the pixel in the third processed image is referred to as a third pixel in this embodiment.

As shown in FIG. 3, the method 300 for obtaining the third processed image may include operation S301: a first linear relationship between a first window including the first pixel and a second window at a corresponding position in the third processed image is determined for each first pixel in the guided image. Herein, a first linear relationship corresponding to any first window is used to describe a linear relationship between each first pixel in the first window and a pixel at a corresponding position in a corresponding second window. Both a size of each first window and a size of the second window at the corresponding position are a first size. Herein, the first size is used to describe a side length of a window. The first size may also be represented by a radius. For example, if the radius is r, the first size may be expressed as (2r+1). Correspondingly, a window satisfying the first size may include (2r+1)×(2r+1) pixels.

In some example embodiments, the first linear relationship determined in operation S301 may be expressed as the following formula:

$$q_i = a_k I_i + b_k, \text{ where } \forall i \in w_k,$$

$w_k$ representing the first window using a pixel k as a center in the guided image, $I_i$ representing an $i^{th}$ first pixel in the first window, $q_i$ representing a third pixel corresponding to an $I_i$ position in the third processed image, $a_k$ representing a slope of first linear relationship, and $b_k$ representing intercept.

Figure 4:
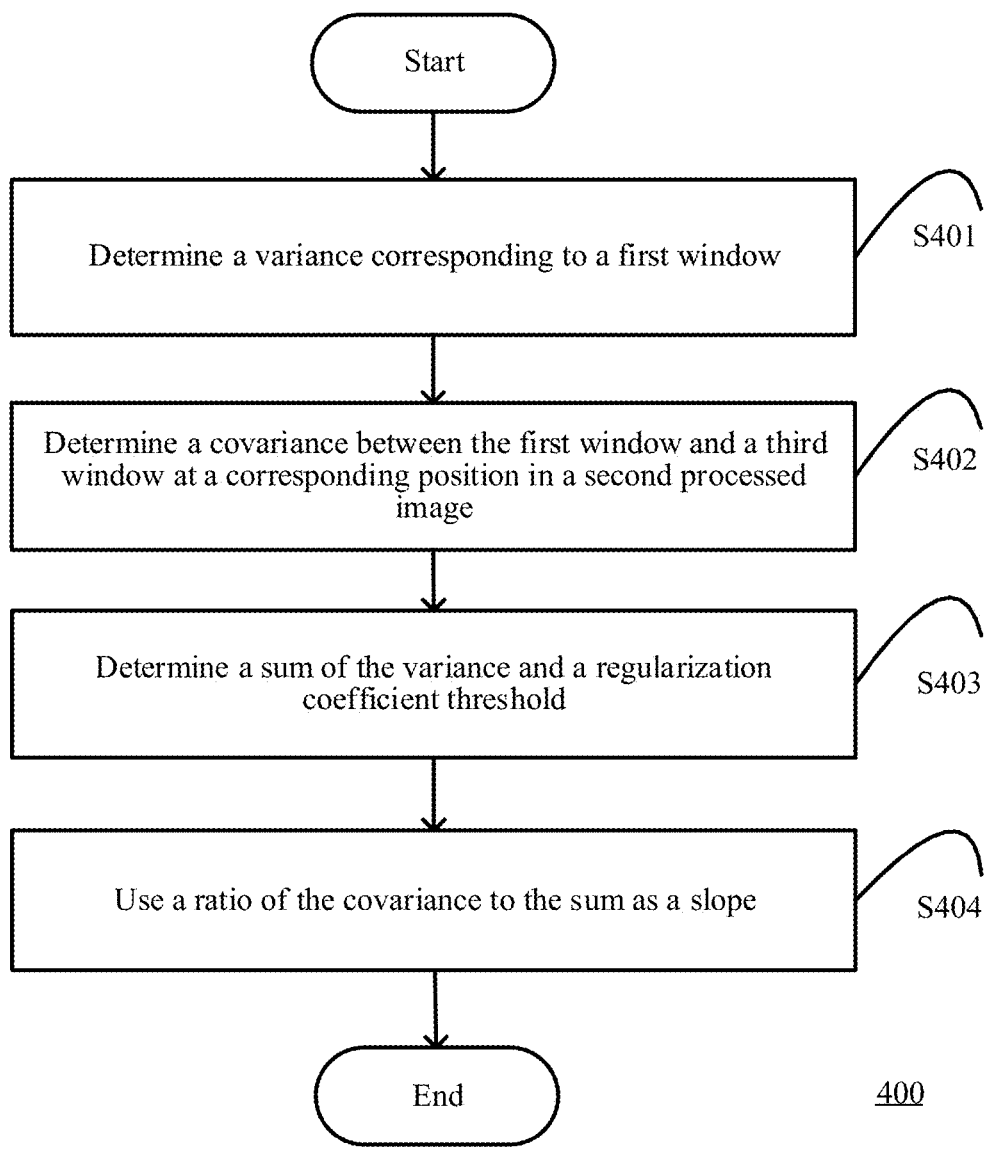
FIG. 4 is a flowchart of a method for determining a slope of a first linear relationship according to some example embodiments.

In some example embodiments, the slope of the first linear relationship may be determined by using a method 400 in operation S301. FIG. 4 is a flowchart of a method 400 for determining a slope of a first linear relationship according to some example embodiments.

In operation S401, a pixel value variance (or a color value variance) of pixels corresponding to the first window is determined.

In operation S402, a covariance between pixel values in the first window and pixel values in a third window at a corresponding position in the second processed image is determined.

In operation S403, a sum of the variance and a regularization coefficient threshold is determined. The regularization coefficient threshold may be a very small positive number.

In operation S404, a ratio of the covariance obtained in operation S402 to the sum obtained in operation S403 is used as the slope.

In some example embodiments, the slope of the first linear relationship may be determined according to the following formula in operation S301:

$$a_k = \frac{\frac{1}{|w|} \sum_{i \in w_k} I_i p_i - u_k \bar{p}_k}{\sigma_k^2 + \varepsilon},$$

$a_k$ representing the slope of the first linear relationship, $w_k$ representing the first window using a pixel k as a center in the guided image, $I_i$ representing a color value of an $i^{th}$ pixel in the first window, $p_i$ representing a color value of an $i^{th}$ pixel in the third window, the third window being a window corresponding to a position of the first window in the second processed image, $u_k$ representing an average color value of all pixels in the first window, $\bar{p}_k$ representing an average color value of all pixels in the third window, $\sigma_k^2$ representing a color value variance of all pixels in the first window, ε representing a regularization coefficient threshold, and |w| representing a total number of pixels in the first window.

Figure 5:
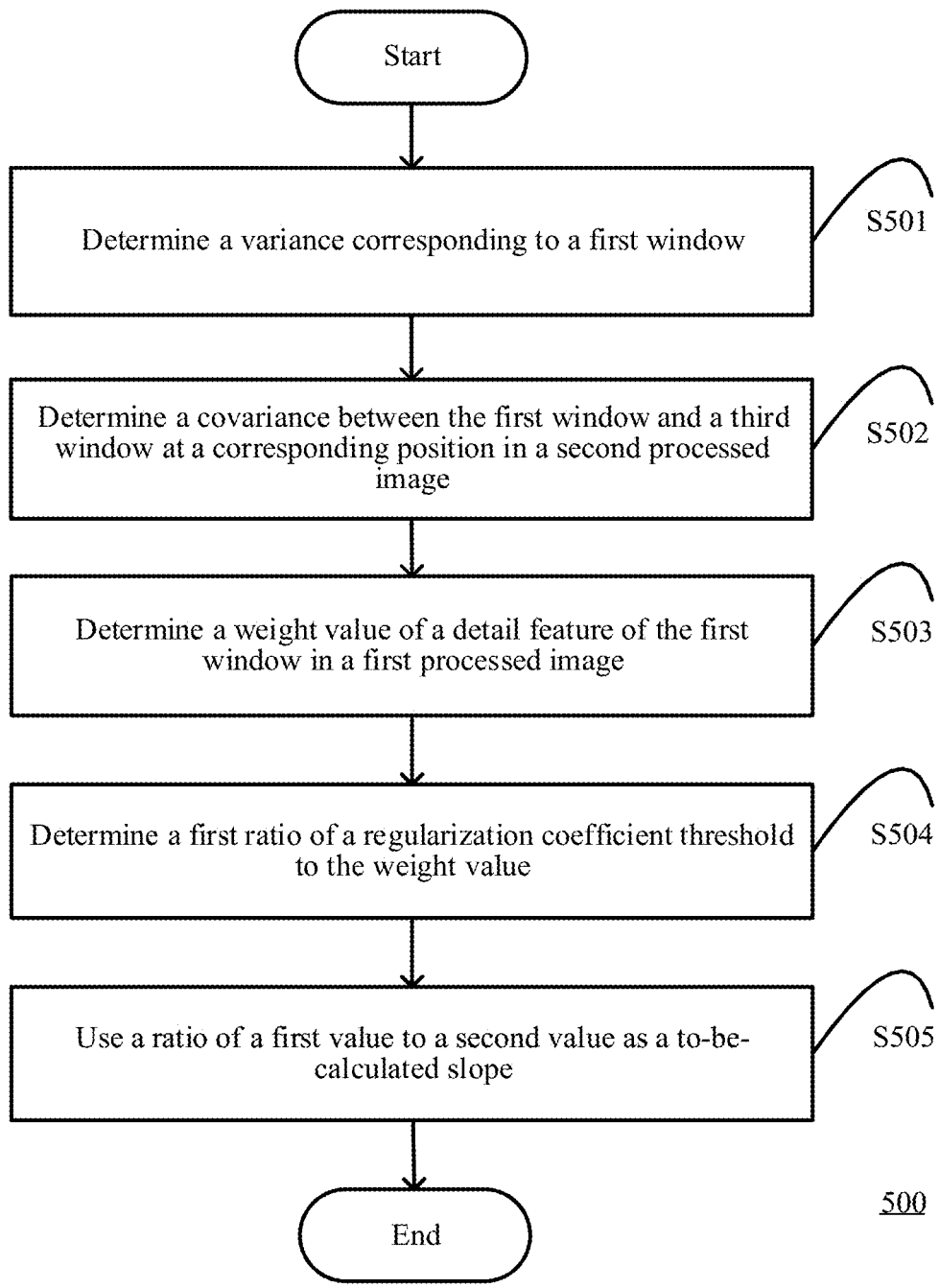
FIG. 5 is a flowchart of a method for determining a slope of a first linear relationship according to some example embodiments.

In some example embodiments, the slope of the first linear relationship may be determined by using a method 500 in operation S301. FIG. 5 is a flowchart of a method 500 for determining a slope of a first linear relationship according to some example embodiments.

As shown in FIG. 5, in operation S501, a variance corresponding to the first window is determined. Herein, the variance corresponding to the first window is a variance of color information of all pixels in the first window.

In operation S502, a covariance between the first window and a third window at a corresponding position in the second processed image is determined.

In operation S503, a weight value of a detail feature of the first window in the first processed image is determined. In some example embodiments, operation S503 may be implemented as a method 600 illustrated in FIG. 6.

Figure 6:
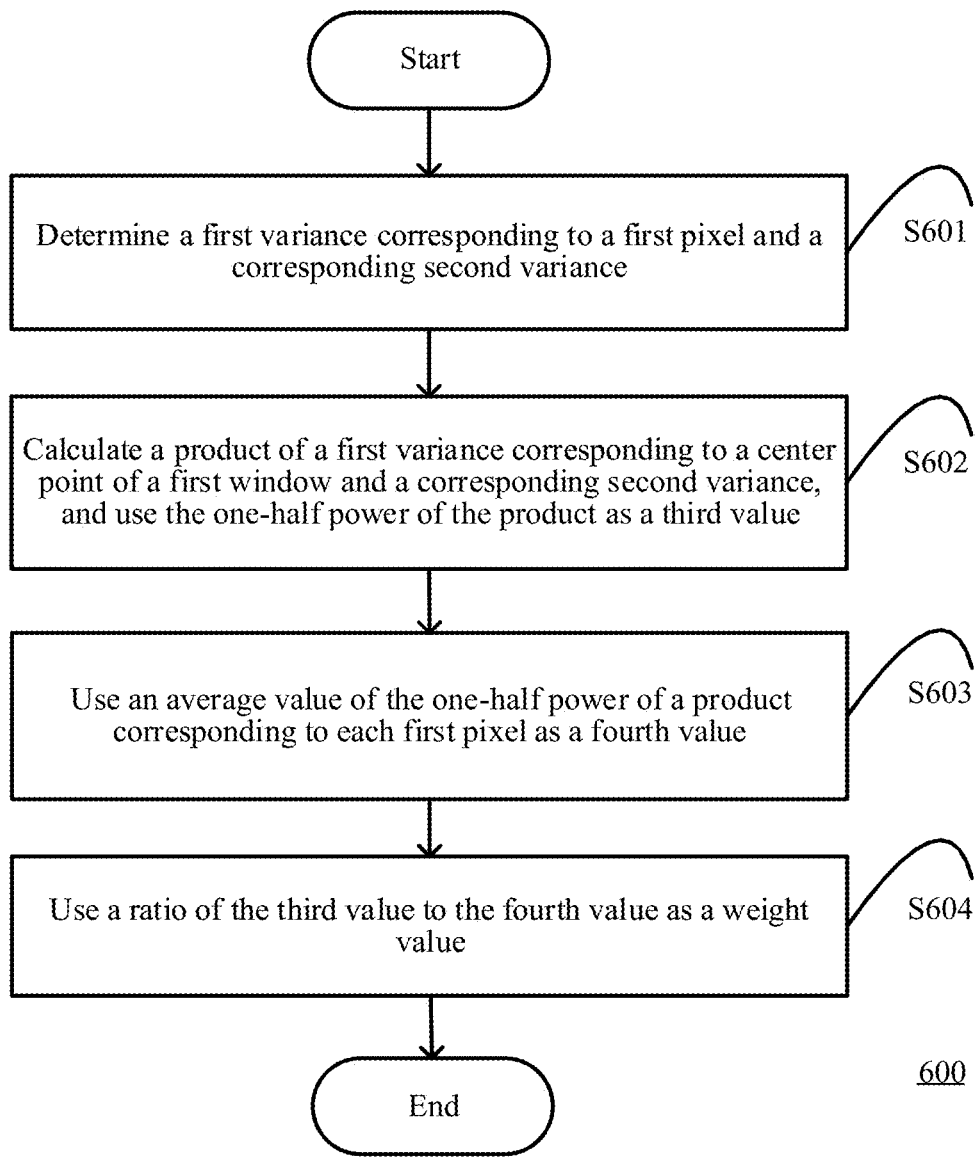
FIG. 6 is a flowchart of a weight value determining method according to some example embodiments.

FIG. 6 is a flowchart of a weight value determining method 600 according to some example embodiments. In operation S601, a first variance corresponding to each first pixel in the guided image and a corresponding second variance are determined. A first variance corresponding to one first pixel represents a variance corresponding to a window using the first pixel as a center and satisfying a second size. A second variance corresponding to one first pixel represents a variance corresponding to a window using the first pixel as a center and satisfying the first size. Herein, the second size may represent a minimum window size used in an image processing process, for example, 3, that is, the radius is 1, but is not limited thereto. In operation S602, a product of a first variance corresponding to a center point of the first window and a corresponding second variance is determined, and the one-half power of the product is used as a third value. In operation S603, a product of the first variance corresponding to each first pixel in the guided image and the corresponding second variance is determined, and an average value of the one-half power of a product corresponding to each first pixel is used as a fourth value. In operation S604, a ratio of the third value to the fourth value is used as the weight value.

In operation S504, a first ratio of the regularization coefficient threshold to the weight value is determined.

In operation S505, a sum of the covariance in operation S502 and the first ratio in operation S504 is used as a first value, a sum of the variance in operation S502 and the first ratio in operation S504 is used as a second value, and a ratio of the first value to the second value is used as the to-be-determined slope. In the process of determining the weight value in the method 500, the weight value is determined by using the second variance (a variance of a color value within a window satisfying the first size) and the slope is determined by using the weight value. In this way, in the image enhancement method 200, when the third processed image is obtained by using a second linear relationship related to the slope, the third processed image may always retain a strongest detail feature in the original image. Herein, if a detail gradient value is larger, detail intensity is higher. In other words, the detail feature may be distinguished according to the detail intensity. In the image enhancement method 200, the strongest detail feature in the original image may be always retained.

In some other example embodiments, the slope of the first linear relationship may be determined according to the following formula in operation S301:

$$a_k = \frac{\left(\frac{1}{|w|}\sum_{i \in w_k} I_i p_i - u_k \bar{p}_k\right) + \varepsilon/weight_k}{\sigma_k^2 + \varepsilon/weight_k},$$

$a_k$ representing the slope of the first linear relationship, $w_k$ representing the first window using a pixel k as a center in the guided image, $I_i$ representing a color value of an $i^{th}$ pixel in the first window, $p_i$ representing a color value of an $i^{th}$ pixel in the third window, the third window being a window corresponding to a position of the first window in the second processed image, $u_k$ representing an average color value of all pixels in the first window, $\bar{p}_k$ representing an average color value of all pixels in the third window, $\sigma_k^2$ representing a color value variance of all pixels in the first window, ε representing a regularization coefficient threshold, |w| representing a total number of pixels in the first window, and $weight_k$ representing a weight value of the first window.

The weight value of the first window may be determined according to the following formula in operation S301:

$$weight_k = \frac{\sqrt{|\sigma_{k|r=1}^2 \cdot \sigma_{k|r=n}^2|}}{\frac{1}{|w_I|}\sum_{i \in I} \sqrt{|\sigma_{i|r=1}^2 \cdot \sigma_{i|r=n}^2|}},$$

n representing a window radius of the first window, $\sigma_{k|r=n}^2$ representing the color value variance of all the pixels in the first window, $\sigma_{k|r=1}^2$ representing a color value variance of all pixels in a window using the pixel k as a center and whose radius is 1, $\sigma_{i|r=1}^2$ representing a color value variance of all pixels in a window using the $i^{th}$ pixel in the first window as a center and whose radius is 1, $\sigma_{i|r=n}^2$ representing a color value variance of all pixels in a window using the $i^{th}$ pixel in the first window as a center and whose radius is a window radius of the first window, I representing the guided image, and $|w_I|$ representing a total number of pixels in the guided image.

After a slope of a first linear relationship corresponding to each first window including one first pixel in operation S301 is determined, intercept of the first linear relationship may be determined according to the slope. In some example embodiments, the intercept may be determined according to the following formula in operation S301:

$b_k = \bar{p}_k - a_k u_k,$ $\bar{p}_k$ representing an average color value of pixels in the third window relative to a position of the first window in the second processed image $a_k$ representing the slope of the first linear relationship, and $u_k$ representing an average color value of all pixels in the first window.

In operation S302, a second linear relationship corresponding to the first pixel is determined according to the first linear relationship corresponding to each first window. The second linear relationship is used to describe a linear relationship between the first pixel and a pixel at a corresponding position in the third processed image. Herein, a slope of the second linear relationship is an average value of a slope of a first linear relationship corresponding to each first window.

In operation S303, a color value of each pixel in the third processed image is determined according to the color value of each first pixel in the guided image and the second linear relationship corresponding to each first pixel. Accordingly, the third processed image is obtained. In some example embodiments, the color value of each pixel in the third processed image may be determined according to the following formula in operation S303:

$$q_i = \frac{1}{|w|}\sum_{k:i\in w_k}(a_k I_i + b_k) = \bar{a}_i I_i + \bar{b}_i, \text{ where}$$

$$\bar{a}_i = \frac{1}{|w|}\sum_{k\in w_i} a_k \text{ and } \bar{b}_i = \frac{1}{|w|}\sum_{k\in w_i} b_k,$$

$a_k$ representing the slope of the first linear relationship, $w_k$ representing the first window using a pixel k as a center in the guided image, $I_i$ representing a color value of an $i^{th}$ pixel in the first window, $|w|$ representing a total number of pixels in the first window, $b_k$ representing intercept of a first linear relationship corresponding to one first window, $q_i$ representing a color value of an $i^{th}$ pixel in a second window corresponding to a position of the first window in the third processed image, $\bar{a}$ representing an average value of a slope of each first window including a pixel i, that is, the slope of the second linear relationship, and $\bar{b}_i$ representing an average value of intercept of each first window including the pixel i, that is, intercept of the second linear relationship.

Figure 7:
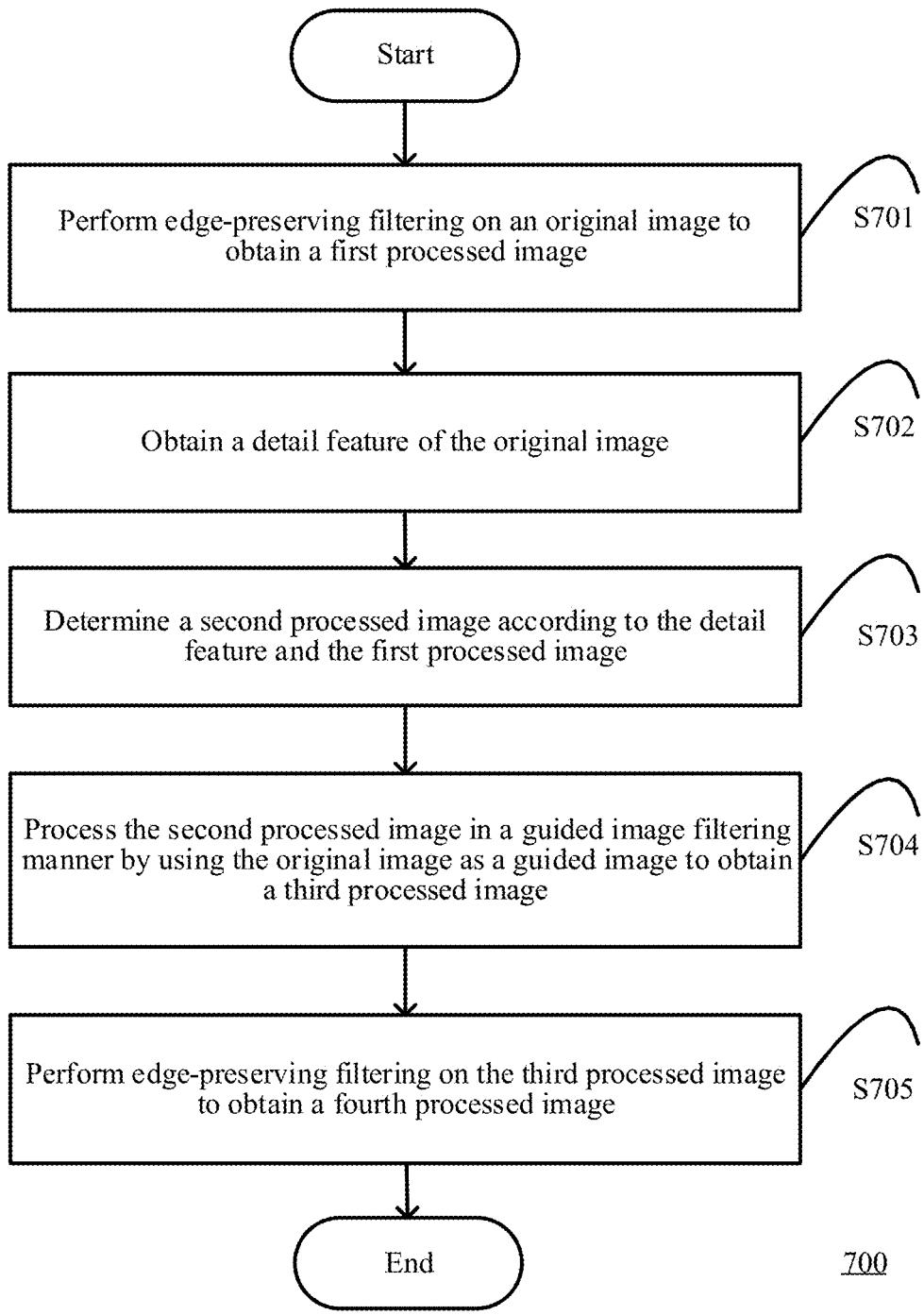
FIG. 7 is a flowchart of an image enhancement method 700 according to some example embodiments.

FIG. 7 is a flowchart of an image enhancement method 700 according to some example embodiments. The image enhancement method 700 may be performed by, for example, a data processing device such as the terminal device 110 shown in FIG. 1A or the video service system 150 shown in FIG. 1B.

As shown in FIG. 7, the image enhancement method 700 may include operation S701 to operation S704. Implementations of operation S701 to operation S704 are the same as those of operation S201 to operation S204, and details are not described herein again.

In addition, the image enhancement method 700 may further include operation S705: edge-preserving filtering is performed on the third processed image to obtain a fourth processed image. In some example embodiments, in operation S705, the third processed image is processed in a guided image filtering manner by using the third processed image as a guidance image to obtain the fourth processed image. In this way, edge-preserving filtering is performed by using the third processed image as a guidance image in operation S705, so that a noise reduction degree may be further improved, thereby enhancing an image enhancement effect.

Figure 8:
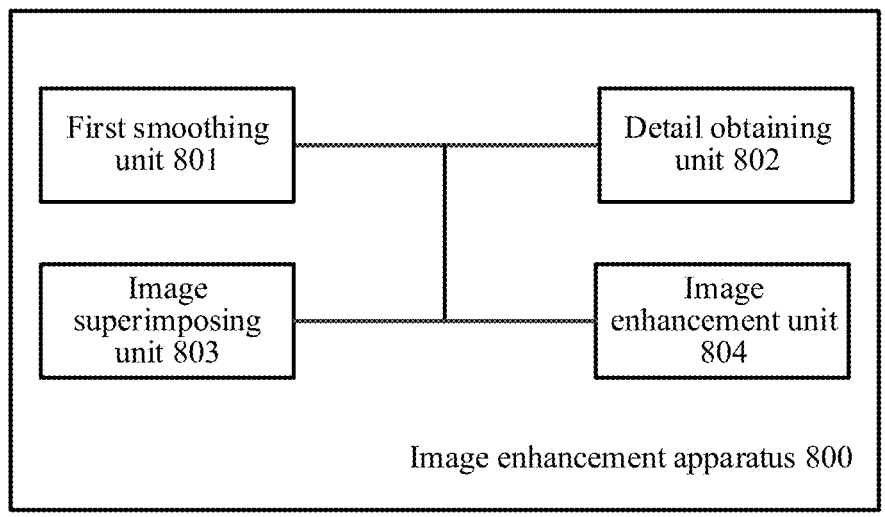
FIG. 8 is a schematic diagram of an image enhancement apparatus 800 according to some example embodiments.

FIG. 8 is a schematic diagram of an image enhancement apparatus 800 according to some example embodiments. A data processing device such as a terminal device 110 or a video service system 150 may include the image enhancement apparatus 800.

As shown in FIG. 8, the image enhancement apparatus 800 may include a first smoothing unit 801, a detail obtaining unit 802, an image superimposing unit 803, and an image enhancement unit 804.

The first smoothing unit 801 is configured to perform edge-preserving filtering on an original image to obtain a first processed image. In some example embodiments, the first smoothing unit 801 processes the original image in a guided image filtering manner by using the original image as a guidance image to obtain the first processed image.

The detail obtaining unit 802 is configured to obtain a detail feature of the original image.

In some example embodiments, the detail obtaining unit 802 may determine a color difference between the original image and the first processed image, and determine the detail feature according to the color difference. In some example embodiments, the detail obtaining unit 802 may determine a difference between the original image and the first processed image on one or more color channels, and use the difference as the color difference. In some example embodiments, the original image is a grayscale image. The detail obtaining unit 802 may determine a grayscale value difference between the original image and the first processed image, and use the grayscale value difference as the color difference. In some other example embodiments, the detail obtaining unit 802 may enhance the color difference according to an adjustment coefficient to obtain an enhanced color difference, and use the enhanced color difference as the detail feature. In some other example embodiments, the detail obtaining unit 802 may use the color difference as the detail feature.

The image superimposing unit 803 is configured to determine a second processed image according to the detail feature and the first processed image.

The image enhancement unit 804 processes the second processed image in a guided image filtering manner by using the original image as a guidance image to obtain a third processed image.

In some example embodiments, the image enhancement unit 804 may determine, for each first pixel in the guided image, a first linear relationship between each first window including the first pixel and a second window at a corresponding position in the third processed image. Both a size of each first window and a size of the second window at the corresponding position are a first size.

In some example embodiments, the image enhancement unit 804 may determine a variance corresponding to the first window. Based on this, the image enhancement unit 804 may determine a sum of the variance and a regularization coefficient threshold. In addition, the image enhancement unit 804 may further determine a covariance between the first window and a third window at a corresponding position in the second processed image. In this way, the image enhancement unit 804 may use a ratio of the covariance to the sum as a slope of the first linear relationship corresponding to the first window. In some example embodiments, the image enhancement unit 804 may determine the slope of the first linear relationship according to the following formula:

$$a_k = \frac{\frac{1}{|w|}\sum_{i\in w_k} I_i p_i - u_k \bar{p}_k}{\sigma_k^2 + \varepsilon},$$

$a_k$ representing the slope of the first linear relationship, $w_k$ representing the first window using a pixel k as a center in the guided image, $I_i$ representing a color value of an $i^{th}$ pixel in the first window, $p_i$ representing a color value of an $i^{th}$ pixel in the third window, the third window being a window corresponding to a position of the first window in the second processed image, $u_k$ representing an average color value of all pixels in the first window, $\bar{p}_k$ representing an average color value of all pixels in the third window, $\sigma_k^2$ representing a color value variance of all pixels in the first window, ε representing a regularization coefficient threshold, and |w| representing a total number of pixels in the first window. In addition, the image enhancement unit 804 may determine intercept of the first linear relationship according to the slope.

In some other example embodiments, the image enhancement unit 804 may determine a variance corresponding to the first window. The image enhancement unit 804 may determine a covariance between the first window and a second window at a corresponding position in the second processed image. In addition, the image enhancement unit 804 may determine a weight value of a detail feature of the first window in the first processed image.

In some example embodiments, the image enhancement unit 804 may determine a first variance corresponding to each first pixel in the guided image and a corresponding second variance. The first variance represents a variance of a window using the first pixel as a center and satisfying a second size. The second variance represents a variance of a window using the first pixel as a center and satisfying the first size. Based on this, the image enhancement unit 804 may determine a product of a first variance corresponding to a center point of the first window and a corresponding second variance, and use the one-half power of the product as a third value. In addition, the image enhancement unit 804 may determine a product of the first variance corresponding to each first pixel in the guided image and the corresponding second variance, and uses an average value of the one-half power of a product corresponding to each first pixel as a fourth value. In this way, the image enhancement unit 804 uses a ratio of the third value to the fourth value as the weight value.

Based on this, the image enhancement unit 804 may determine a first ratio of a regularization coefficient threshold to the weight value. The image enhancement unit 804 may use a sum of the covariance and the first ratio as a first value, and use a sum of the variance and the first ratio as a second value. In this way, the image enhancement unit 804 may use a ratio of the first value to the second value as a slope of the first linear relationship corresponding to the first window.

In some example embodiments, the image enhancement unit 804 may determine the slope of the first linear relationship according to the following formula:

$$a_k = \frac{\left(\frac{1}{|w|}\sum_{i \in w_k} I_i p_i - u_k \bar{p}_k\right) + \varepsilon/weight_k}{\sigma_k^2 + \varepsilon/weight_k},$$

$a_k$ representing the slope of the first linear relationship, $w_k$ representing the first window using a pixel k as a center in the guided image, $I_i$ representing a color value of an $i^{th}$ pixel in the first window, $p_i$ representing a color value of an $i^{th}$ pixel in the third window, the third window being a window corresponding to a position of the first window in the second processed image, $u_k$ representing an average color value of all pixels in the first window, $\bar{p}_k$ representing an average color value of all pixels in the third window, $\sigma_k^2$ representing a color value variance of all pixels in the first window, ε representing a regularization coefficient threshold, |w| representing a total number of pixels in the first window, and $weight_k$ representing a weight value of the first window.

The image enhancement unit 804 may determine the weight value of the first window according to the following formula:

$$weight_k = \frac{\sqrt{|\sigma_{k|r=1}^2 \cdot \sigma_{k|r=n}^2|}}{\frac{1}{|w_l|}\sum_{i \in l}\sqrt{|\sigma_{i|r=1}^2 \cdot \sigma_{i|r=n}^2|}}$$

n representing a window radius of the first window, $\sigma_{k|r=n}^2$ representing the color value variance of all the pixels in the first window, $\sigma_{k|r=1}^2$ representing a color value variance of all pixels in a window using the pixel k as a center and whose radius is 1, $\sigma_{i|r=1}^2$ representing a color value variance of all pixels in a window using the $i^{th}$ pixel in the first window as a center and whose radius is 1, $\sigma_{i|r=n}^2$ representing a color value variance of all pixels in a window using the $i^{th}$ pixel in the first window as a center and whose radius is a window radius of the first window, I representing the guided image, and $|w_I|$ representing a total number of pixels in the guided image.

After determining the first linear relationship corresponding to each first window, the image enhancement unit 804 may determine a second linear relationship corresponding to the first pixel according to the first linear relationship corresponding to each first window. The second linear relationship is used to describe a linear relationship between the first pixel and a pixel at a corresponding position in the third processed image.

Based on this, the image enhancement unit 804 may determine a color value of each pixel in the third processed image according to a color value of each first pixel in the guided image and the second linear relationship corresponding to each first pixel. In view of the above, the image enhancement apparatus 800 may obtain a third processed image with a high smoothness degree and an enhanced detail feature. Herein, according to the image enhancement apparatus 800, a noise reduction degree of an image is improved and a detail feature is enhanced, so that pictures are clearer, overall brightness is more uniform, a sense of layering is stronger, a contrast is higher, and colors are more vivid. If a contrast is higher, a color level of an image is higher, and a picture is fuller. In particular, the image enhancement apparatus 800 may achieve adaptive processing of image content, thereby improving robustness of image processing. In addition, in the image enhancement apparatus 800, brightness of the third processed image may be more uniform in the guided image filtering manner.

Figure 9:
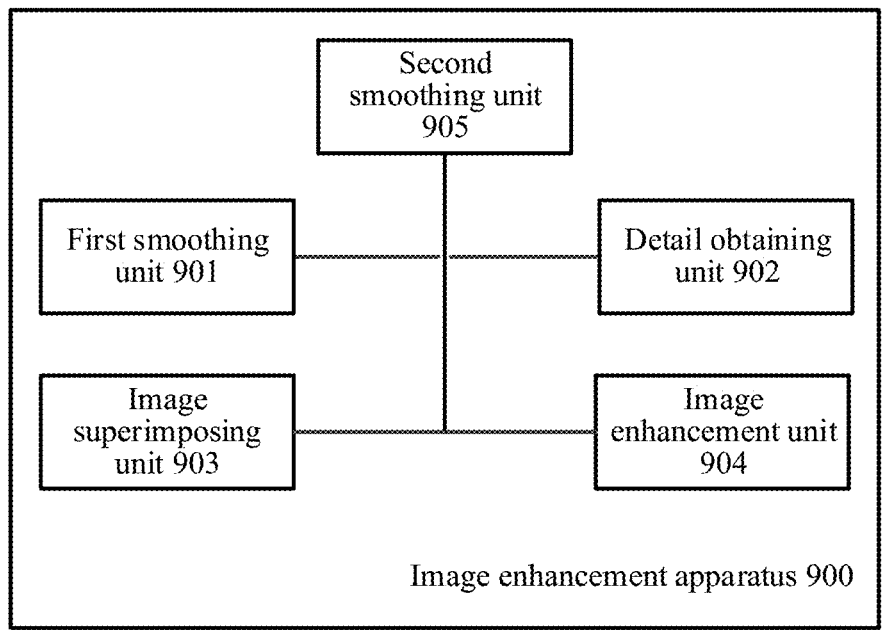
FIG. 9 is a schematic diagram of an image enhancement apparatus 900 according to some example embodiments.

FIG. 9 is a schematic diagram of an image enhancement apparatus 900 according to some example embodiments. A data processing device such as a terminal device 110 or a video service system 150 may include the image enhancement apparatus 900.

As shown in FIG. 9, the image enhancement apparatus 900 may include a first smoothing unit 901, a detail obtaining unit 902, an image superimposing unit 903, and an image enhancement unit 904. Herein, implementations of the first smoothing unit 901, the detail obtaining unit 902, the image superimposing unit 903, and the image enhancement unit 904 are consistent with the implementations of the first smoothing unit 801, the detail obtaining unit 802, the image superimposing unit 803, and the image enhancement unit 804, and details are not described herein again.

In addition, the image enhancement apparatus 900 may further include a second smoothing unit 905 configured to perform edge-preserving filtering on the third processed image to obtain a fourth processed image. In some example embodiments, the second smoothing unit 905 processes the third processed image in a guided image filtering manner by using the third processed image as a guidance image to obtain the fourth processed image. In this way, edge-preserving filtering is performed by using the third processed image as a guidance image, so that the image enhancement apparatus 900 may further improve a noise reduction degree, thereby enhancing an image enhancement effect.

Figure 10:
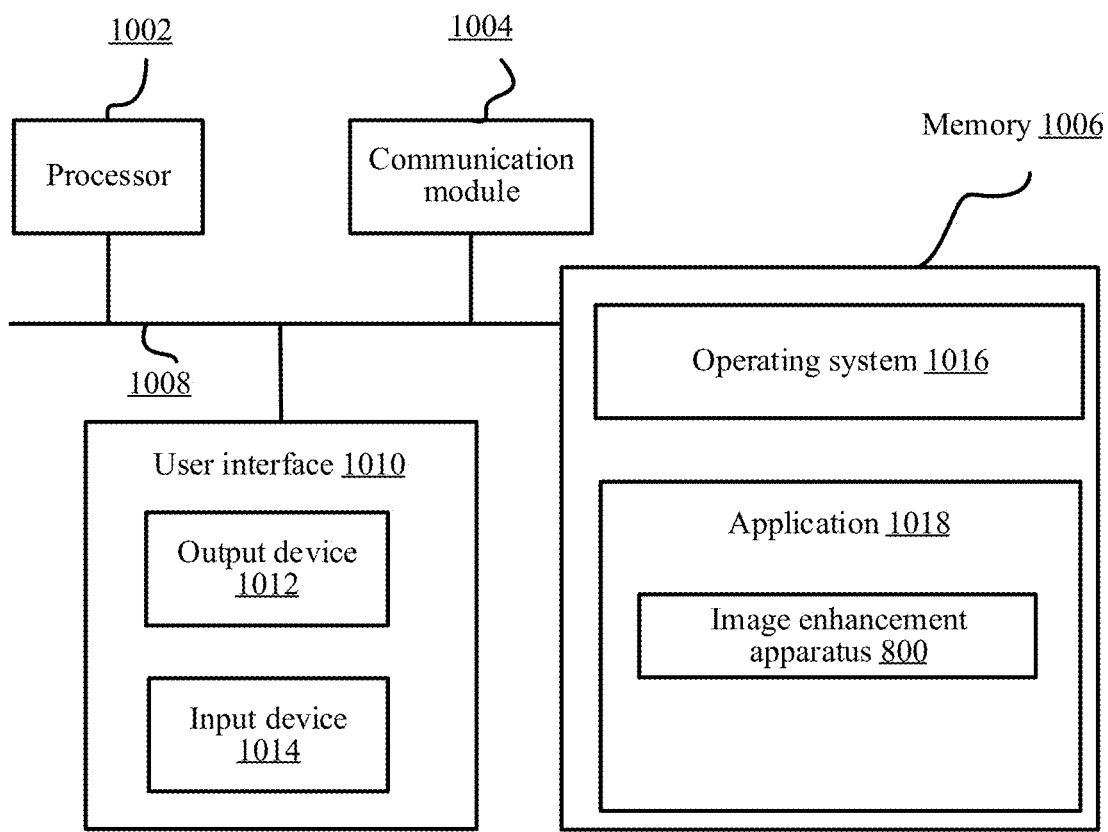
FIG. 10 shows a structural composition diagram of a data processing device.

FIG. 10 shows a structural composition diagram of a data processing device. The data processing device may be implemented as a terminal device 110 or a video service system 150. As shown in FIG. 10, the data processing device includes one or more processors (CPU) 1002, a communications module 1004, a memory 1006, a user interface 1010, and a communications bus 1008 for interconnecting these components.

The processor 1002 may receive and send data by using the communications module 1004 to implement network communication and/or local communication.

The user interface 1010 includes one or more output devices 1012, including one or more speakers and/or one or more visualization displays. The user interface 1010 further includes one or more input devices 1014. The user interface 1010 may, for example, receive an instruction of a remote control, but is not limited thereto. The one or more output devices 1012 may include a display device configured to display the third processed image that is obtained as a result of processing of the image enhancement apparatus 800 shown in FIG. 8 or the image enhancement apparatus 900 shown in FIG. 9.

The memory 1006 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices.

The memory 1006 stores a set of instructions executable by the processor 1002, including:

an operating system 1016 including programs for handling various basic system services and executing a hardware-related task; and an application 1018 including various programs for implementing the above-mentioned image enhancement method, the programs implementing the processing procedure in the foregoing embodiment, for example, including the image enhancement apparatus 800 shown in FIG. 8 or the image enhancement apparatus 900 shown in FIG. 9. In this way, the image enhancement apparatus may obtain a third processed image with a high smoothness degree and an enhanced detail feature. Herein, according to the image enhancement apparatus, a noise reduction degree of an image is improved and a detail feature is enhanced, so that pictures are clearer, overall brightness is more uniform, a sense of layering is stronger, a contrast is higher, and colors are more vivid.

In addition, each embodiment of this application may be implemented by a data processing program executed by a data processing device such as a computer. Apparently, the data processing program constitutes this application.

In addition, generally, a data processing program stored in a storage medium is directly read from the storage medium for execution or the program is installed on or replicated to a storage device (such as a hard disk or memory) of a data processing device for execution. Therefore, such a storage medium also constitutes the present invention. The storage medium may use any type of recording manner, for example, a paper storage medium (such as paper tape), a magnetic storage medium (such as a floppy disk, a hard disk, and a flash memory), an optical storage medium (such as CD-ROM), and a magneto-optical storage medium (such as MO).

Therefore, this application further provides a non-volatile storage medium, which stores a data processing program. The data processing program is used for executing any one or part of the embodiments of the foregoing image enhancement method of this application.

In addition, the operations of the method of this application may be implemented not only by the data processing program, but also by hardware, such as a logic gate, a switch, an Application Specific Integrated Circuit (ASIC), a programmable logic controller, and an embedded microcontroller. Therefore, the hardware that may implement the image enhancement method of this application may also constitute this application.

According to the image enhancement solution in various example embodiments, the third processed image with a high smoothness degree and an enhanced detail feature may be obtained. Therefore, according to the image enhancement solution of example embodiments, a noise reduction degree of an image may be improved and a detail feature in the original image may be enhanced, so that pictures may be clearer, overall brightness may be more uniform, a sense of layering may be stronger, a contrast may be higher, and colors may be more vivid.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

The foregoing descriptions are merely exemplary example embodiments, but are not intended to limit this application. Any modification, equivalent replacement, or improvement made without departing from the spirit and principle of this application falls within the protection scope of this application.

What is claimed is:

1. A method of processing an image, performed by a data processing device, the method comprising:
   performing a first edge-preserving filtering on an original image to obtain a first processed image;
   obtaining a detail feature of the original image based on the original image and the first processed image;
   generating a second processed image according to the detail feature and the first processed image; and
   processing the second processed image in a guided image filtering manner by using the original image as a first guidance image, to obtain a third processed image, and outputting the third processed image to be displayed,
   wherein the processing the second processed image comprises:
   determining a linear relationship between a first pixel in the original image as the first guidance image and a pixel at a corresponding position in the third processed image; and
   determining a color value of each pixel in the third processed image according to a color value of each first pixel in the original image as the first guidance image by using the linear relationship.

2. The method according to claim 1, further comprising: performing a second edge-preserving filtering on the third processed image to obtain a fourth processed image.

3. The method according to claim 2, wherein the performing the second edge-preserving filtering comprises:
   processing the third processed image in the guided image filtering manner by using the third processed image as a second guidance image to obtain the fourth processed image.

4. The method according to claim 1, wherein the performing the first edge-preserving filtering comprises:
   processing the original image in the guided image filtering manner by using the original image as a third guidance image to obtain the first processed image.

5. The method according to claim 1, wherein the obtaining the detail feature comprises:
   determining a color difference between the original image and the first processed image, and obtaining the detail feature based on the color difference.

6. The method according to claim 5, wherein the determining the color difference comprises:
   determining, as the color difference, a difference between the original image and the first processed image on one or more color channels.

7. The method according to claim 6, wherein the original image is a grayscale image, and the determining the color difference comprises:
   determining, as the color difference, a grayscale value difference between the original image and the first processed image.

8. The method according to claim 5, wherein the determining the detail feature comprises:
   enhancing the color difference according to an adjustment coefficient to obtain an enhanced color difference, and determining the enhanced color difference as the detail feature.

9. The method according to claim 5, wherein the obtaining the detail feature based on the color difference comprises determining the color difference as the detail feature.

10. The method according to claim 1, wherein the determining the linear relationship between the first pixel in the original image and the pixel at the corresponding position in the third processed image comprises:
    determining, for each first pixel in the original image as the first guidance image, a first linear relationship between each first window comprising the first pixel and a second window at a corresponding position in the third processed image, a size of each first window and a size of the second window being a first size; and
    determining, based on the first linear relationship corresponding to each first window, a second linear relationship between the first pixel and the pixel at the corresponding position in the third processed image.

11. The method according to claim 10, wherein the determining the first linear relationship comprises:
    determining a variance corresponding to the first window for any first window comprising the first pixel;
    determining a covariance between the first window and a third window at a corresponding position in the second processed image;
    determining a sum of the variance and a regularization coefficient threshold; and
    determining a ratio of the covariance to the sum as a slope of the first linear relationship corresponding to the first window.

12. The method according to claim 10, wherein the determining the first linear relationship comprises:
    determining a variance corresponding to the first window;
    determining a covariance between the first window and the second window at a corresponding position in the second processed image;
    determining a weight value of a detail feature of the first window in the first processed image;
    determining a first ratio of a regularization coefficient threshold to the weight value; and
    based on a sum of the covariance and the first ratio as a first value, and a sum of the variance and the first ratio as a second value, obtaining a ratio of the first value to the second value as a slope of the first linear relationship corresponding to the first window.

13. The method according to claim 12, wherein the determining the weight value comprises:
    determining a first variance corresponding to each first pixel in the original image as the first guidance image and a corresponding second variance, the first variance representing a variance of a window that uses the first pixel as a center and whose size satisfies a second size, and the second variance representing a variance of a window that uses the first pixel as a center and whose size satisfies the first size;
    determining a first product of a first variance corresponding to a center point of the first window and a corresponding second variance, and obtaining an one-half power of the first product as a third value;
    determining a second product of the first variance corresponding to each first pixel in the original image as the first guidance image and the corresponding second variance, and obtaining an average value of an one-half power of the second product as a fourth value; and
    obtaining a ratio of the third value to the fourth value as the weight value.

14. The method according to claim 10, wherein the determining the first linear relationship comprises:
    determining a slope of the first linear relationship according to the following formula:

$$a_k = \frac{\frac{1}{|w|}\sum_{i\in w_k} I_i p_i - u_k \bar{p}_k}{\sigma_k^2 + \varepsilon}$$

$a_k$ representing the slope of the first linear relationship, $w_k$ representing the first window using a pixel k as a center in a guidance image, $I_i$ representing a color value of an $i^{th}$ pixel in the first window, $p_i$ representing a color value of an $i^{th}$ pixel in a third window, the third window being a window corresponding to a position of the first window in the second processed image, $u_k$ representing an average color value of all pixels in the first window, $\bar{p}_k$ representing an average color value of all pixels in the third window, $\sigma_k^2$ representing a color value variance of all pixels in the first window, $\varepsilon$ representing a regularization coefficient threshold, and $|w|$ representing a total number of pixels in the first window.

15. The method according to claim 10, wherein the determining the first linear relationship comprises:
    determining a slope of the first linear relationship according to the following formula:

$$a_k = \frac{\left(\frac{1}{|w|}\sum_{i\in w_k} I_i p_i - u_k \bar{p}_k\right) + \varepsilon/weight_k}{\sigma_k^2 + \varepsilon/weight_k}$$

$a_k$ representing the slope of the first linear relationship, $w_k$ representing the first window using a pixel k as a center in a guidance image, $I_i$ representing a color value of an $i^{th}$ pixel in the first window, $p_i$ representing a color value of an $i^{th}$ pixel in a third window, the third window being a window corresponding to a position of the first window in the second processed image, $u_k$ representing an average color value of all pixels in the first window, $\bar{p}_k$ representing an average color value of all pixels in the third window, $\sigma_k^2$ representing a color value variance of all pixels in the first window, $\varepsilon$ representing a regularization coefficient threshold, $|w|$ representing a total number of pixels in the first window, and $weight_k$ representing a weight value of the first window; and
determining the weight value $weight_k$ of the first window according to the following formula:

$$weight_k = \frac{\sqrt{|\sigma_{k|r=1}^2 \cdot \sigma_{k|r=n}^2|}}{\frac{1}{|w_I|}\sum_{i\in I}\sqrt{|\sigma_{i|r=1}^2 \cdot \sigma_{i|r=n}^2|}}$$

n representing a window radius of the first window, $\sigma_{k|r=n}^2$ representing the color value variance of all the pixels in the first window, $\sigma_{k|r=1}^2$ representing a color value variance of all pixels in a window using the pixel k as a center and whose radius is 1, $\sigma_{i|r=1}^2$ representing a color value variance of all pixels in a window using the $i^{th}$ pixel in the first window as a center and whose radius is 1, $\sigma_{i|r=n}^2$ representing a color value variance of all pixels in a window using the $i^{th}$ pixel in the first window as a center and whose radius is the window radius of the first window, I representing the first guidance image, and $|I_l|$ representing a total number of pixels in the first guidance image.

16. An apparatus for processing an image, comprising:
    at least one memory configured to store program code; and
    at least one processor configured to read the program code and operate as instructed by the program code, the program code comprising:
        first smoothing code configured to cause at least one of the at least one processor to perform a first edge-preserving filtering on an original image to obtain a first processed image;
        detail obtaining code configured to cause at least one of the at least one processor to obtain a detail feature of the original image based on the original image and the first processed image;
        image superimposing code configured to cause at least one of the at least one processor to generate a second processed image according to the detail feature and the first processed image; and
        image enhancement code configured to cause at least one of the at least one processor to process the second processed image in a guided image filtering manner by using the original image as a guidance image, to obtain a third processed image and output the third processed image to be displayed,
    wherein the image enhancement code causes at least one of the at least one processor to determine a linear relationship between a first pixel in the original image as the first guidance image and a pixel at a corresponding position in the third processed image, and determine a color value of each pixel in the third processed image according to a color value of each first pixel in the original image as the first guidance image by using the linear relationship.

17. The apparatus according to claim 16, wherein the program code further comprises code configured to cause at least one of the at least one processor to perform a second edge-preserving filtering on the third processed image to obtain a fourth processed image.

18. The apparatus according to claim 17, wherein the second edge-preserving filtering comprises:
    processing the third processed image in the guided image filtering manner by using the third processed image as a second guidance image to obtain the fourth processed image.

19. The apparatus according to claim 16, wherein the first smoothing code causes at least one of the at least one processor to process the original image in the guided image filtering manner by using the original image as a third guidance image to obtain the first processed image.

20. A non-transitory storage medium storing one or more programs, executable by one or more processors of a data processing device, to cause the one or more processors of the data processing device to perform an image enhancement method, the method comprising:
    performing an edge-preserving filtering on an original image to obtain a first processed image;
    obtaining a detail feature of the original image based on the original image and the first processed image;
    determining a second processed image according to the detail feature and the first processed image; and
    performing a guided image filtering on the second processed image, by using the original image as a guidance image, to obtain a third processed image, and outputting the third processed image to be displayed,
    wherein the performing the guided image filtering on the second processed image comprises:

determining a linear relationship between a first pixel in the original image as the first guidance image and a pixel at a corresponding position in the third processed image; and determining a color value of each pixel in the third processed image according to a color value of each first pixel in the original image as the first guidance image by using the linear relationship.

\* \* \* \* \*